United States Patent
Keesey et al.

(10) Patent No.: US 7,734,734 B2
(45) Date of Patent: *Jun. 8, 2010

(54) DOCUMENT SHADOWING INTRANET SERVER, MEMORY MEDIUM AND METHOD

(75) Inventors: James Louis Keesey, Sunnyvale, CA (US); Gerald Johann Wilmot, Marina, CA (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 12/170,150

(22) Filed: Jul. 9, 2008

(65) Prior Publication Data

US 2008/0270536 A1 Oct. 30, 2008

Related U.S. Application Data

(63) Continuation of application No. 10/631,637, filed on Jul. 31, 2003, now Pat. No. 7,426,547, which is a continuation of application No. 09/343,643, filed on Jun. 30, 1999, now Pat. No. 6,622,167.

(51) Int. Cl.
*G06F 15/16* (2006.01)

(52) U.S. Cl. ................ 709/219; 709/229; 709/239; 709/201; 709/227

(58) Field of Classification Search .......... 709/219, 709/228, 229, 226, 239, 201; 710/104; 713/1
See application file for complete search history.

(56) References Cited

U.S. PATENT DOCUMENTS

| | | |
|---|---|---|
| 5,678,041 A | 10/1997 | Baker et al. |
| 5,706,467 A | 1/1998 | Vishlitzky et al. |
| 5,727,159 A | 3/1998 | Kikinis |
| 5,745,754 A | 4/1998 | Lagarde et al. |
| 5,752,246 A | 5/1998 | Rogers et al. |
| 5,754,939 A | 5/1998 | Herz et al. |
| 5,761,663 A | 6/1998 | Lagarde et al. |
| 5,774,660 A | 6/1998 | Brendel et al. |
| 6,006,238 A | 12/1999 | Packard |
| 6,069,627 A | 5/2000 | Conrad et al. |
| 6,076,108 A | 6/2000 | Courts et al. |

(Continued)

*Primary Examiner*—Djenane M Bayard
(74) *Attorney, Agent, or Firm*—Ohlandt, Greeley, Ruggiero & Perle, L.L.P.; Kym Moore, Esq.

(57) ABSTRACT

An intranet server, memory medium and process for handling requests for resources from a downstream intranet server or a user. The intranet server is configured by a data shadowing program to locally store resources that have a high usage frequency. If a resource has not been requested for a predetermined time out period, it is deleted from local memory. Resources stored in local memory are served in response to requests for them, thus avoiding the service of such resources over the internet each time they are requested. An inquiry procedure handles status requests for new versions in either an active or a passive mode. In the active mode, the intranet server that directly interfaces with the internet periodically checks the status and receives updated versions of resources stored in its local memory. The resources stored in local memory are then served upon request from a user. In the passive mode, status inquiries are sent upstream through the intranet system then via the internet to the web server that serves the resource being requested. The web server returns a revised version only if there is one.

11 Claims, 8 Drawing Sheets

U.S. PATENT DOCUMENTS

| | | |
|---|---|---|
| 6,085,193 A | 7/2000 | Malkin et al. |
| 6,112,228 A | 8/2000 | Earl et al. |
| 6,260,061 B1 | 7/2001 | Krishnan et al. |
| 6,272,598 B1 | 8/2001 | Arlitt et al. |
| 6,275,858 B1 | 8/2001 | Bates et al. |
| 6,330,606 B1 | 12/2001 | Logue et al. |
| 9,660,561 | 12/2001 | Cohen et al. |
| 6,405,198 B1 | 6/2002 | Bitar et al. |
| 6,425,057 B1 | 7/2002 | Cherkasova et al. |
| 6,434,609 B1 | 8/2002 | Humphrey |
| 2002/0082854 A1 | 6/2002 | Furuta et al. |
| 2002/0129116 A1 | 9/2002 | Humphrey |
| 2003/0061272 A1 | 3/2003 | Krishnamurthy et al. |

DOCUMENT SHADOWING INTRANET SERVER, MEMORY MEDIUM AND METHOD

CROSS-REFERENCE TO RELATED PATENT APPLICATIONS

This application is a Continuation application of, and claims the benefit of and priority to, U.S. patent application Ser. No. 10/631,637, filed on Jul. 31, 2003, now U.S. Pat. No. 7,426,547, which is a Continuation application of, and claims the benefit of and priority to, U.S. patent application Ser. No. 09/343,643, filed on Jun. 30, 1999, now U.S. Pat. No. 6,622,167, the contents of which are incorporated by reference.

FIELD OF INVENTION

This invention relates to an intranet system and in particular to an intranet server, a method of operating the intranet server and a memory medium for the intranet server.

BACKGROUND OF INVENTION

Intranet systems are used in organizations, such as large corporations, that have a relatively large number of users who request resources via the internet from web servers on the world wide web (WWW). The resources requested generally include data contained in documents, web pages or other formats. A simple intranet system 10, shown in FIG. 1, has a proxy server 11 that receives the requests of a plurality of users C1, C2 and C3, obtains the requested resources from a web server 12 via the internet 13. These resources are then provided to the users.

The internet 13 is the network that forms connections or links L1 or L2 between intranet system 10 and web servers, such as web server 12. Links L1 and L2 are part of the internet. Links, such as L1 and L2, carry the brunt of the WWW traffic.

The stateless nature of the WWW servers can at times congest WWW traffic so much that the world wide web becomes the worldwide wait. As an example, consider the situation where users C1, C2 and C3 request the same web page from web server 12. The requested web page is sent over links L1 and L2 three times. This type of retransmission causes traffic congestion of information flow on the internet.

What is needed is a solution that reduces internet traffic congestion so as to allow a more rapid flow of information between the internet and its users.

An object of the present invention is to provide an intranet server that reduces internet traffic congestion by shadowing the information flow across an interface between the internet and an intranet system.

Another object of the present invention is to provide an intranet server that locally stores high usage resources and provides such resources to intranet users.

Still another object of the present invention is to provide a method of operating an intranet server to locally store high usage resources and provide such resources to intranet users.

Yet another object of the present invention is to provide a memory medium that causes an intranet server to locally store high usage resources and provide such resources to intranet users.

SUMMARY OF INVENTION

According to the present invention, an intranet server is provided to handle the requests for resources from one or more intranet servers or users that are downstream of the intranet server. An update means updates a usage count for each request from a downstream intranet server or a user for a resource. A maintaining means maintains the resource in a local memory if the usage count is equal to or greater than a threshold count value. A communication means sends an inquiry to an upstream intranet server or to a web server that is capable of serving the resource. This inquiry identifies the resource, whether the resource is stored in local memory, and the local version status of the resource. The response to the inquiry includes a current version status of the resource, a current version of the resource if the current version is more recent than the local version or if the resource is not stored in the local memory. The current version is stored in the local memory if the usage count is equal to or greater than the threshold count value. Server means serves the resource to the downstream intranet server or user that is currently requesting the resource.

The intranet server may also include a means for removing the resource from the local memory when a time out period has elapsed without receiving a request for the resource. In a more general sense, the resource is one of a plurality of resources with each having a separate usage count and time out or expiry value.

In another embodiment of the present invention, the intranet server has the capability of handling a priority resource that the operator of the intranet system considers mandatory for keeping in local memory of all intranet servers in the system. For this embodiment, the maintenance means maintains the priority resource in the local memory without regard for frequency of usage or elapsed time between requests for the priority resource. The serving means serves the priority resource, whenever received as new or revised from an upstream server or an intranet operator, to a downstream intranet server.

The intranet server of the present invention is capable of operating in a passive mode, an active mode or selectively in either mode. In a passive mode, user requests are handled by requesting resource status from an upstream intranet server or from a web server before servicing the user request. In the active mode, at least the intranet server that interfaces directly with the internet periodically checks the status of and updates the resources in its local memory to maintain at all times current versions of resources that meet the usage and time out requirements. For operation in the active mode, means are provided to periodically send an inquiry to a web server for each resource stored in its local memory. The inquiry identifies a resource and its local version status. The response will include a newer version, if any. Newer versions are substituted for older versions to keep the resources up to date. When a user request for a resource stored in the local memory is received, the resource is served from the local memory without an update inquiry to the internet.

According to an alternate embodiment of the present invention, a memory medium controls an intranet server that handles the requests of one or more downstream intranet servers or users for resources. The memory medium stores a program that configures the intranet server to have an update means that updates a usage count for each request from a downstream intranet server or a user for a resource. A maintaining means maintains the resource in a local memory if the usage count is equal to or greater than a threshold count value. A communication means sends an inquiry to an upstream intranet server or to a web server that is capable of serving the resource.

This inquiry identifies the resource, whether the resource is stored in the local memory and the local version status of the resource. The response to the inquiry includes a current version status of the resource, a current version of the resource if the current version is more recent than the local version or if the resource is not stored in the local memory. The current version is stored in the local memory if the usage count is equal to or greater than the threshold count value. Server means serves the resource to the downstream intranet server or user that is currently requesting the resource.

The intranet server may also include a means for removing the resource from the local memory when a time out period has elapsed without receiving a request for the resource. In a more general sense, the resource is one of a plurality of resources with each having a separate usage count and expiry value.

In another embodiment of the present invention, the memory medium controls the intranet server to handle a priority resource that the operator of the intranet system considers mandatory for keeping in local memory of all intranet servers in the system. For this embodiment, the maintenance means maintains the priority resource in the local memory without regard for frequency of usage or elapsed time between requests for the priority resource. The serving means serves the priority resource, whenever received as new or revised from an upstream server or an intranet operator, to a downstream intranet server.

According to the invention, the memory medium controls the intranet system to operate in the passive mode, the active mode or selectively in either mode. For operation in the active mode, means are provided to periodically send an inquiry to a web server for each resource stored in its local memory. The inquiry identifies a resource and its local version status. The response will include a newer version, if any. Newer versions are substituted for older versions to keep the resources up to date. When a user request for a resource stored in the local memory is received, the resource is served from the local memory without an update status inquiry to the internet.

A method embodiment of the present invention involves operating an intranet server that handles the requests of one or more downstream intranet servers or users by maintaining in a local memory those resources that are frequently requested. The method involves updating a usage count for each request from a downstream intranet server or a user for a resource. The resource is maintained in the local memory of the intranet server if the usage count is equal to or greater than a threshold count value. An inquiry is then sent to an upstream intranet server or to a web server that is capable of serving the resource. The inquiry identifies the resource, its storage status and its version status.

The response to the inquiry includes the current version status of the resource and a current version if the current version is more recent than the locally stored version or if the resource is not locally stored. If the response contains a current version of the resource, the current version is stored in the local memory if the usage count for the resource is equal to or greater than a threshold count value. The resource is then served to the downstream intranet server or user that requested the resource. Each resource in the local memory has a separate usage count and expiry value. After each use, the usage count is updated and the expiry value is reset.

In some embodiments of the present invention, a time out step is used. The time out step involves removing the resource from the local memory when a time out period has elapsed without receiving a request for the resource. That is, the time out period elapses when the expiry value equals the current date.

Another feature that may be used in the various embodiments of the method according to the invention involves the handling of a priority document. This involves the steps of maintaining a priority resource in the local memory without regard for frequency of usage or elapsed time between requests. When the priority resource is received as new or revised from an upstream server or an intranet operator, it is served to downstream intranet servers.

According to the invention, the method is operable in the passive mode, the active mode or selectively in either mode. For operation in the active mode, an inquiry is periodically sent to a web server for each resource stored in its local memory. The inquiry identifies a resource and its local version status. The response will include a newer version, if any. Newer versions are substituted for older versions to keep the resources up to date. When a user request for a resource stored in the local memory is received, the resource is served to the user directly or via any intervening downstream intranet servers from the local memory without an update status inquiry to the internet.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENT

Figure 1:
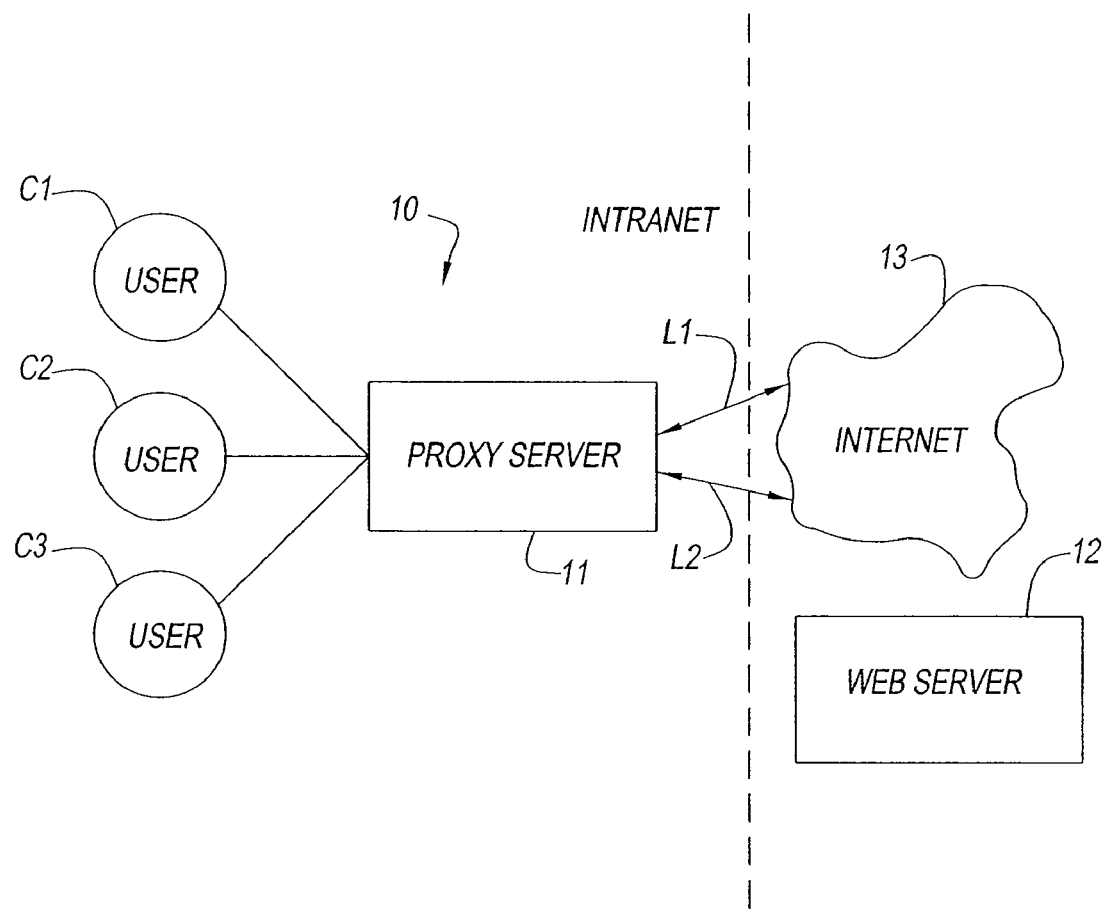
FIG. 1 is a block diagram of a prior art intranet system.
Figure 2:
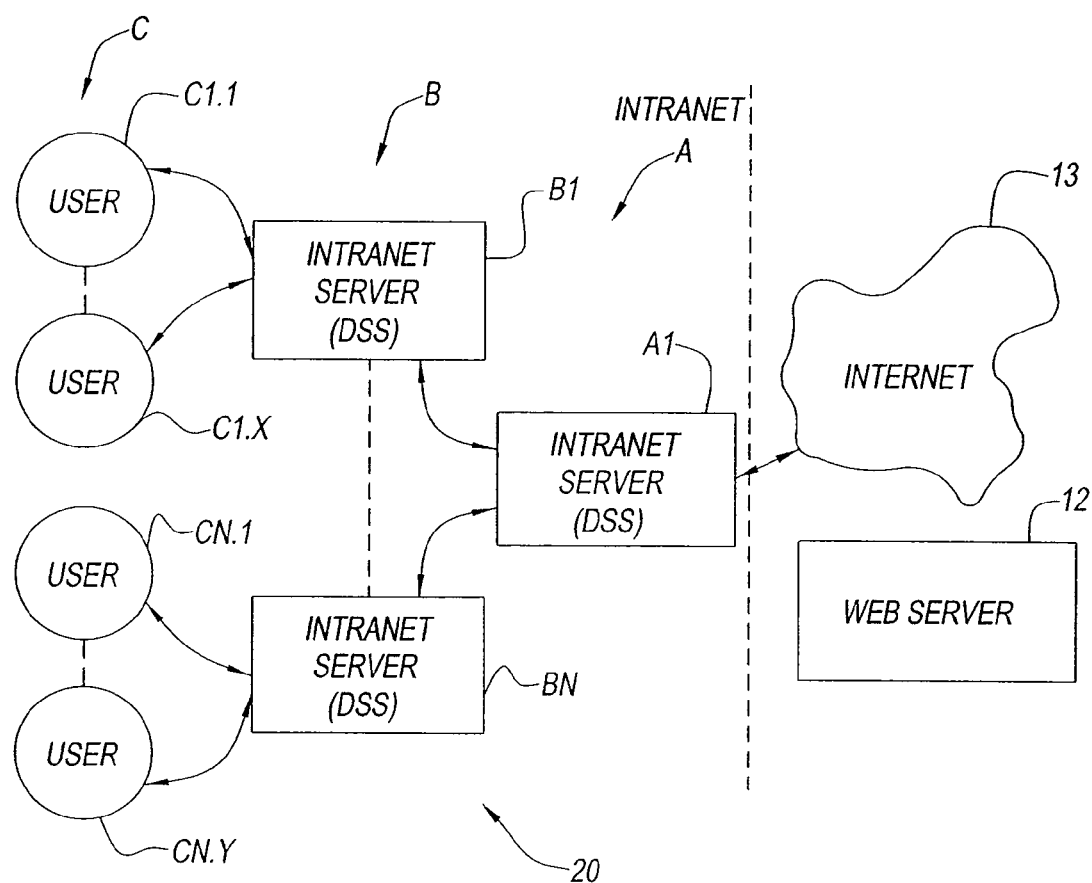
FIG. 2 is a block diagram of an intranet system that uses intranet servers according to the present invention.

With reference to FIG. 2, there is provided an intranet system, generally represented by numeral 20. Intranet system 20 has a plurality of levels of servers and users arranged in a tree configuration. Although the number of levels is determined by the number of users to be served in intranet system 20, only three levels A, B and C are shown for the purpose of description.

Level A has a single intranet server A1. Level B has a plurality of intranet servers B1 to BN. Level C has a plurality of users allocated to intranet servers B1 to BN. Thus, users C1.1 to C1.X are arranged to communicate with intranet server B1 and users CN.1 to CN.Y are arranged to communicate with intranet server BN. The parameters, N, X, and Y are integers other than 0.

In intranet system 20, information flows in an upstream direction toward level A or in a downstream direction toward level C. For example, a request for a document made by user C1.1 flows upstream to intranet server B1. A request for a document served by intranet server B1 flows upstream to intranet server A1. A request response served by intranet server A1 flows downstream to intranet server B1. A request response served by intranet server B1 flows downstream to user C1. In this example, information flows upstream and downstream in a branch defined by user C1.1, intranet server B1 and intranet server A1.

Users C1.1 to C1.X and CN.1 to CN.Y are typically user terminals that are capable of running a browser program for communicating with internet 13 via intranet servers A1 and B1 to BN. For example, users C1.1 to C1.X and CN.1 to CN.Y may be personal computers, palm computers, telephones, suitably equipped televisions and the like.

Intranet server A1 is the sole interface to internet 13 for intranet system 20. Requests for documents from users, such as C1.1 in the aforementioned example, flow upstream to intranet server A1. Intranet server A1 then serves the requests via internet 13 to a web server, such as web server 12. Intranet server A1 via internet 13 receives responses to such requests.

In a typical prior art intranet system, intranet servers A1 and B1 to BN are proxy servers that merely pass requests upstream and responses downstream. In accordance with the present invention, intranet servers A1 and B1 to BN have the capability of locally storing documents that have a high frequency of usage. This capability permits the intranet servers to service the intranet users' requests for these documents without making requests for web server 12 to repetitively serve such documents as each request is made. This helps to reduce traffic congestion on intranet 20.

Figure 3:
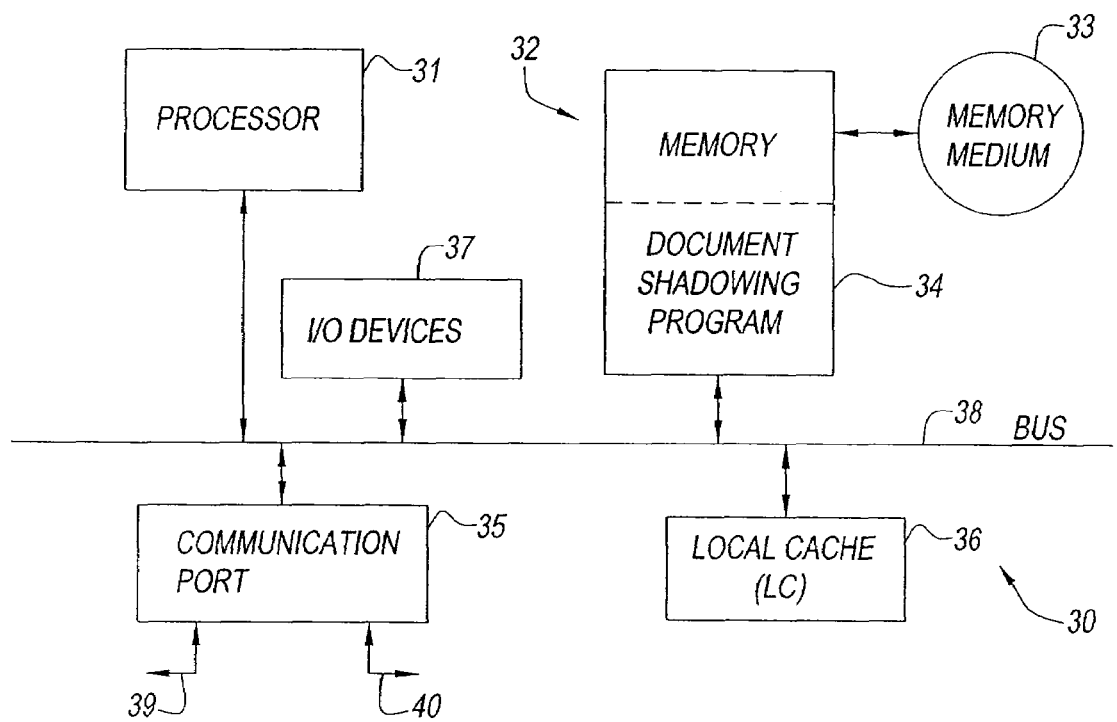
FIG. 3 is a block diagram of an intranet server according to the present invention.

Referring to FIG. 3, there is provided an intranet server 30 according to the present invention that can be used for one, more, or, preferably, all of the intranet servers A1 and B1 to BN. Intranet server 30 has a document shadowing capability to monitor the flow of documents in intranet system 20 to determine a frequency of usage that qualifies a document for local storage. For this reason, these intranet servers are termed document shadowing servers (DSS).

Intranet server 30 has a processor 31, a memory 32, a memory medium 33, a communication device 35, input/output (I/O) devices 37 and a local cache (LC) 36, all of which are interconnected via a computer bus 38. Computer 31, memory 32, memory medium 32, communication device 35, I/O devices 37 and local cache 36 operate as a computer system under the control of processor 31. Generally, processor 31 operates under control of programs stored in memory 32 to process data that is also stored in memory 32. Communication device 35 is operable to receive and transmit data via a port 39 to a downstream intranet server or user and via a port 40 to an upstream intranet server or internet 13. I/O devices 37 are operable in the conventional manner to provide input data, commands and the like and output display or printing of information.

In accordance with the invention, intranet server 30 is equipped with local cache 36 and a document shadowing program 34. Document shadowing program 34 is stored in memory 32 and operates to configure intranet server 30 as a DSS. Alternatively, document shadowing program 34 may be stored on memory medium 33 that runs in conjunction with memory 34. Alternatively, document shadowing program may be supplied on memory medium 33 and loaded into memory 32.

Document shadowing program 34 causes intranet server 30 to act as a DSS to monitor the flow of documents in intranet system 20 and to and from internet 13. Documents that have or exceed a predetermined usage frequency are stored in local cache 36 for rapid retrieval and serving to a downstream DSS or user. Document shadowing program 34 can be figured to operate in either a passive mode or an active mode. Document shadowing program 34 also includes the capability of requiring a document considered as mandatory (sometimes referred to herein as a priority document) by the operator of intranet system 20 to be stored without regard to usage frequency.

Figure 4:
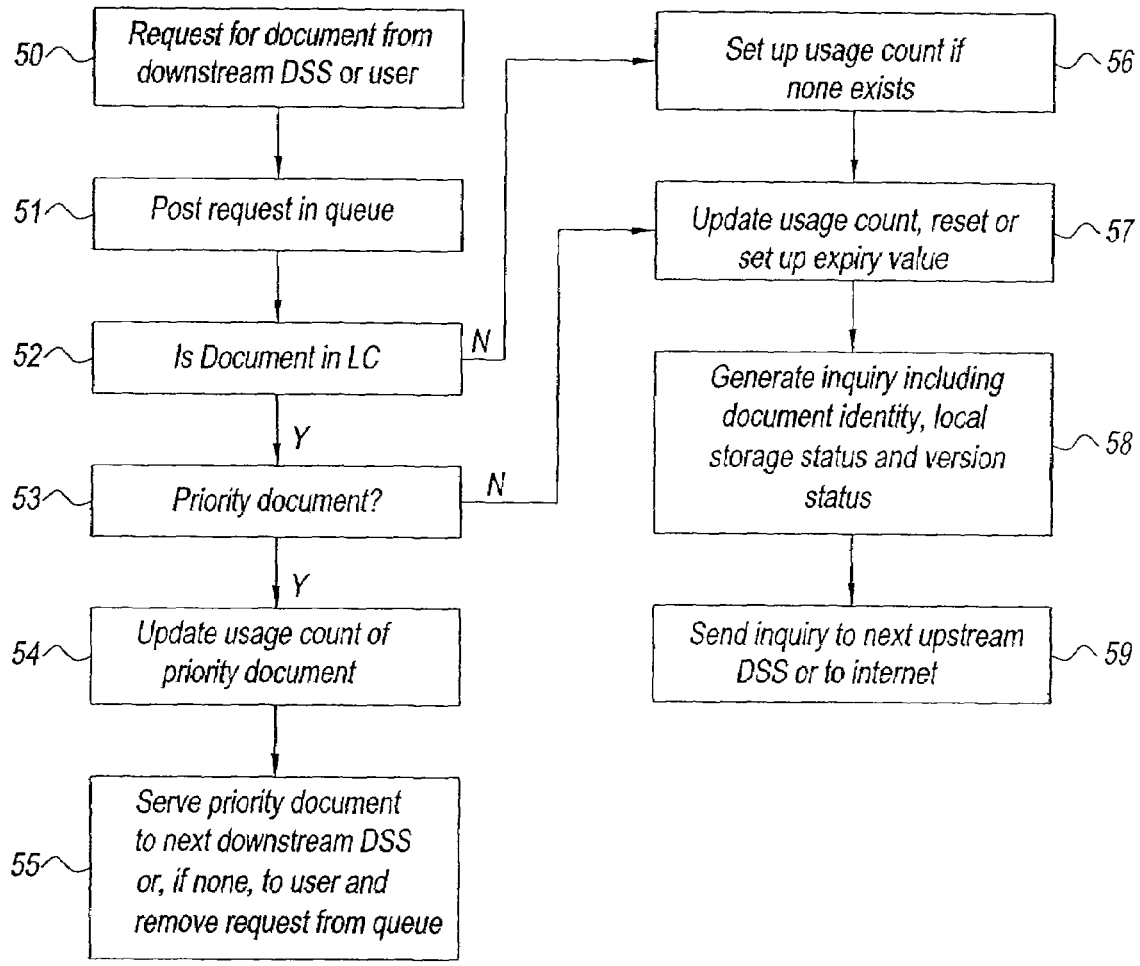
FIG. 4 is a process flow diagram of the document shadowing program of the intranet server for handling a request for a document.
Figure 5:
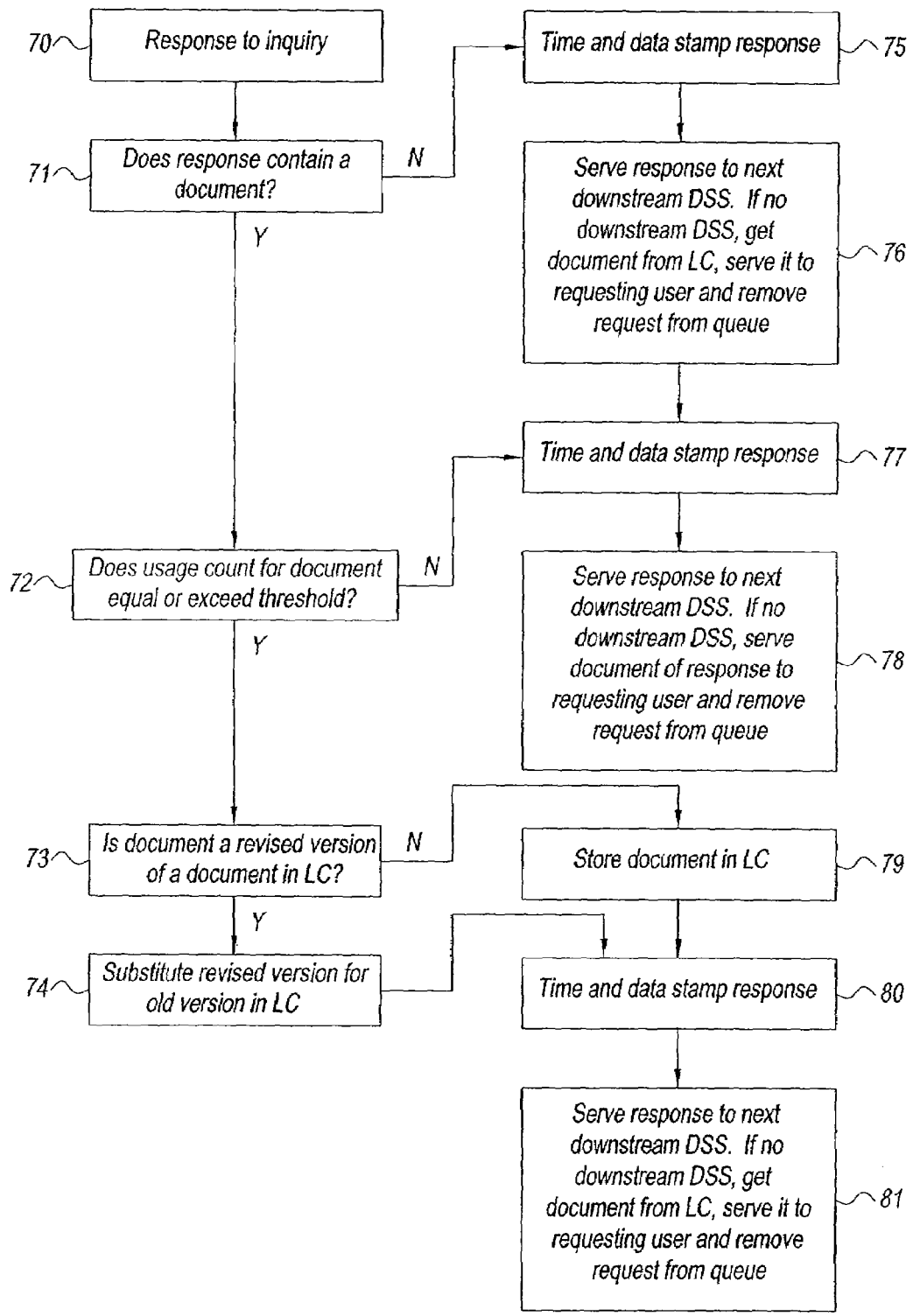
FIG. 5 is a process flow diagram of the document shadowing program for handling a response to an inquiry.
Figure 6:
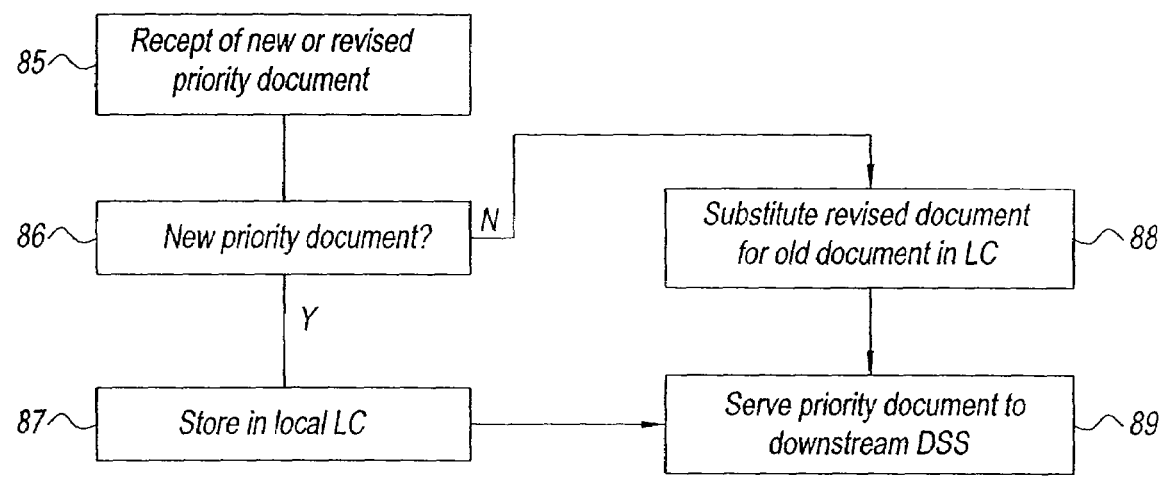
FIG. 6 is a process flow diagram of the document shadowing program for handling a priority document.

Referring generally to FIGS. 4 through 6, the passive mode handles a request for a document by sending a current version status inquiry to an upstream DSS or to web server 12 via internet 13. Referring first to FIG. 4, the process for handling a request from a downstream DSS or a user for a document begins at step 50 with the receipt of the request. The next step 51 involves posting the request to a request queue. In step 52, it is determined whether the document is in local cache. If so, step 53 determines if the document is a priority document. If so, the priority document is time and date stamped at step 54. The next step 55 serves the priority document to the next downstream DSS or to the user. Step 55 also removes the request from the request queue.

If at step 52 the document is not in local cache, step 56 is performed next. Step 56 sets up a usage count for this document if none already exists. The next step 57 updates the usage count and resets the expiry value or sets up an expiry value if none exists. Step 57 is alternatively performed after step 53 if the document is not a priority document. The next step 58 involves generating an inquiry that identifies the document, local storage status and version status. In the next step 59, the inquiry is sent to the next upstream DSS or to internet 13.

Referring to FIG. 5, the process for handling a response to an inquiry begins at step 70 by receiving the response. Next, step 71 determines whether the response contains a document. The response has a document if the requested document is not stored locally or if the document is a revised version of a document stored locally. If the response contains a document, step 72 performs a test as to whether the usage count for this document equals or exceeds a predetermined threshold value. If so, step 73 then determines if the document is a revised version of a document stored in local cache. If so, the revised version is substituted for the old version in local cache by step 74. Next, a step 80 is performed as described below.

If the response does not contain a document at step 71, the response is time and date stamped at step 57. Next, step 76 serves the response to the next downstream DSS. If there is no downstream DSS, the document is retrieved from local cache and served to the requesting user. The request is then removed from the request queue.

If the usage count for the document does not equal or exceed the threshold value, the document will not be put in local cache. The response is then time and date stamped by step 77. Next, step 78 serves the response to the next downstream DSS. If there is no downstream DSS, the document is retrieved from local cache and served to the requesting user. The request is then removed from the request queue.

If the document is not a revised version at step 73, The document must be one that for the first time has equaled the threshold. Step 79 then stores the document in local cache. Next, step 80 time and date stamps the response. Step 81 then serves the response to the next downstream DSS. If there is no downstream DSS, the document is retrieved from local cache and served to the requesting user. The request is then removed from the request queue.

As mentioned above, document shadowing program 34 has the capability of handling priority documents that the operator of intranet system 20 wants to have available to all system users. Referring to FIG. 6, a priority document is processed beginning at step 85 with receipt of a new or a priority document from an I/O device or an upstream DSS. Step 86 determines if the priority document is new or revised. If the document is new, step 87 stores the new document in local cache. If the document is a revision, it is substituted for the old document in local cache by step 88. Next step 89 serves the new or revised priority document to a downstream DSS, if any.

The document shadowing program 34 described and shown in FIGS. 4 through 6 configures a DSS to operate in a passive mode whereby each request initiates an inquiry process to determine if the document has been revised. When this process ends, the document is then served to the requesting user.

In one preferred embodiment of the invention, document shadowing program 34 also has the capability of operating in an active mode. In the active mode, intranet server A1 is configured to periodically serve internet 13 with requests for new versions, if any, of documents stored in its local cache. New versions are then substituted for old versions in the local cache of DSS A1. In the active mode, inquiries for document version status are pushed upstream from the user to DSS A1. If there is a revised version in local cache of DSS A1, it is pushed downstream toward the requesting user. Alternatively, new versions could be pushed downstream to any DSS that has previously requested the document independently of the user request and inquiry process of FIGS. 4 through 6. Any DSS that is downstream of DSS A1 operates as described for FIGS. 4 through 6 for either the active or the passive mode.

Figure 7:
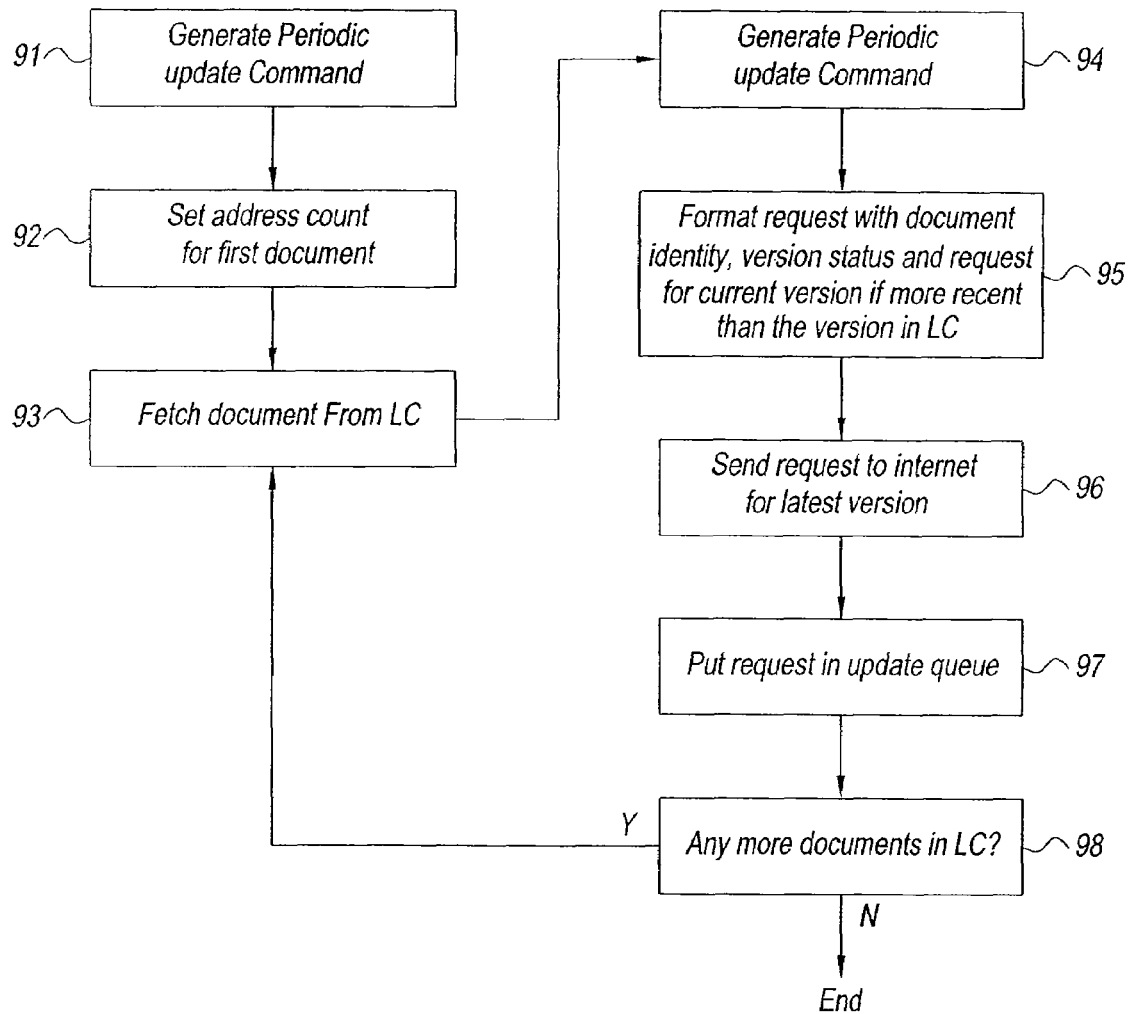
FIG. 7 is a process flow diagram of the document shadowing program for generating update requests when operating the intranet server in an active mode.

Referring to FIG. 7, step 91 begins with a command to start the active mode update process. Step 92 then sets an address count for the first document in local cache. Step 93 next fetches the document from local cache. Step 94 changes the address count by one. Next, step 95 formats a request to internet 13. The request identifies the document, the version in local cache and a request to be served with any newer version. At step 96, the request is sent to internet 13. At step 97, the request is put in a request queue. Next, step 98 determines if there are any more documents in local cache. If not, the generation of periodic requests ends. If there are more documents, steps 93 through 98 are repeated for the nest document. This iteration continues until the last document (other than priority documents) has been processed.

Figure 8:
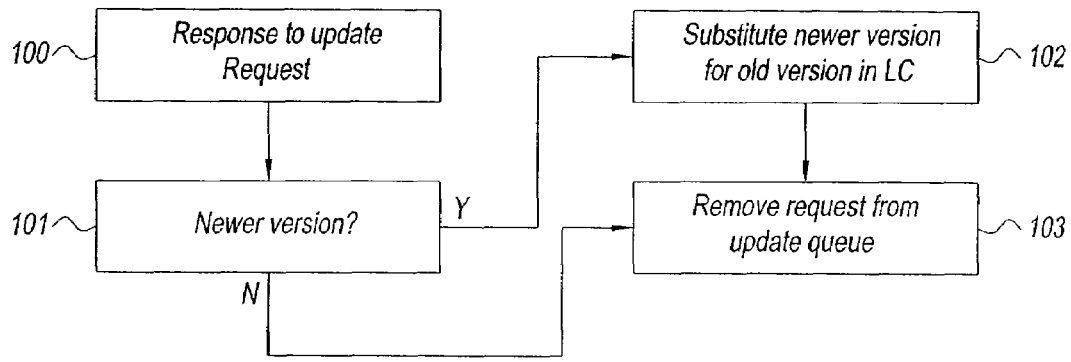
FIG. 8 is a process flow diagram of the document shadowing program for handling responses to update requests when operating the intranet server in an active mode.

Referring to FIG. 8, the active mode for handling responses to update requests begins at step 100 with a receipt of a response to an update request. Step 101 then determines if the response contains a newer version. If not, the request is removed from the update queue by step 103. If so, step 102 then substitutes the newer version for the old version in local cache. The request is then removed from the update queue by step 103. The update process ends when the update request queue is empty. The update process can be scheduled for low traffic times on the internet, such as late at night.

Figure 9:
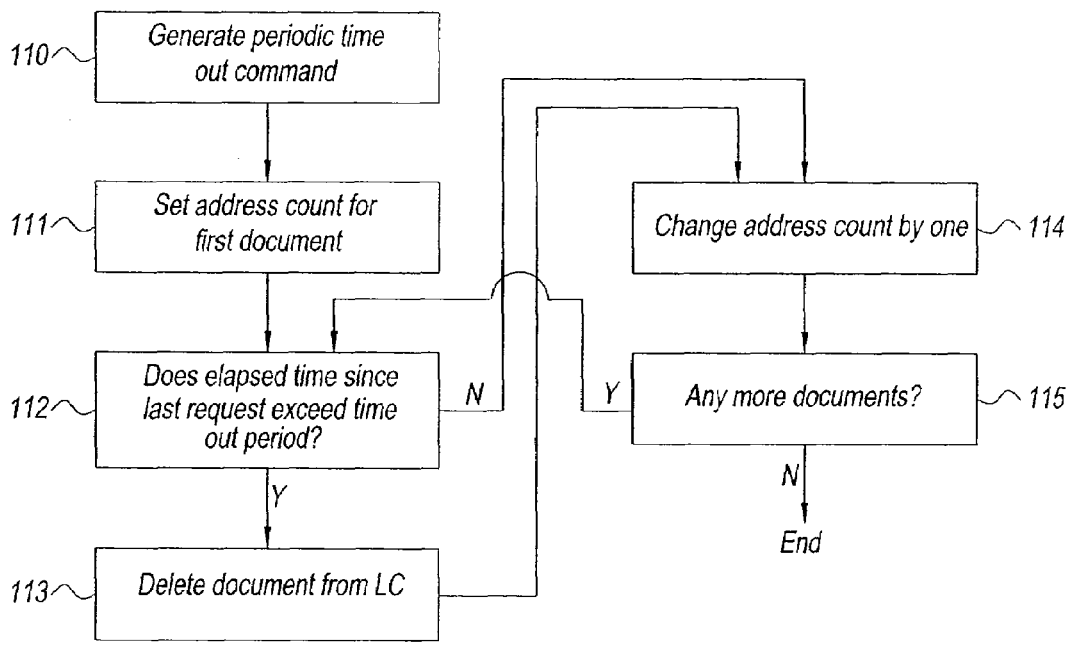
FIG. 9 is a process flow diagram of the document shadowing program for removing inactive resources from the local memory.

Document shadowing program 34 in some embodiments has the capability to remove documents from local cache when they have not been requested for a period of time referred to herein as a time out period. Referring to FIG. 9, the time out process is entered at step 110 with the generation of time out command. The address count is set for the first document in local cache by step 111. Next, step 112 determines if the elapsed time since the last request for the document exceeds a time out period. If so, step 113 deletes the document from local cache. If not, step 114 changes the address count by one. Step 114 also changes the address count after step 113 deletes a document from local cache. Next, step 115 determines if there are any more documents. If not, the time out process ends. If so, steps 112 through 115 are repeated until all documents (other than priority documents) have been tested.

The present invention having been thus described with particular reference to the preferred forms thereof, it will be obvious that various changes and modifications may be made therein without departing from the spirit and scope of the present invention as defined in the appended claims.

What is claimed is:

1. A memory medium for controlling an intranet server that handles the requests of one or more downstream intranet servers or users for resources that are served by one or more web servers via an internet to said intranet server via an upstream intranet server, said memory medium comprising:
    (a) means for controlling said intranet server to maintain and update a usage count for each request from said downstream intranet servers or users for a first resource;
    (b) means for controlling said intranet server to maintain said first resource in a local memory of said intranet server if said usage count is equal to or greater than a threshold count value;
    (c) means for controlling said intranet server to send an inquiry to said upstream intranet server or to one of said web servers that is capable of serving said first resource, said inquiry identifying said first resource, whether said first resource is stored in said local memory, and the local version status of said first resource if so stored;
    (d) means for controlling said intranet server to receive a response to said inquiry, said response including a current version status of said first resource, a current version of said first resource if said current version is more recent than said local version or if said first resource is not stored in said local memory;
    (e) means for controlling said intranet server to store said current version of the first resource, when received, in said local memory if said usage count is equal to or greater than said threshold count value, and
    (f) means for controlling said intranet server to serve said first resource to one of said downstream intranet servers or users that is currently requesting said first resource.

2. The memory medium of claim 1, further comprising:
    (a) means for controlling said intranet server to maintain an expiry value for said first resource and to reset said expiry value for each usage of said first resource;
    (b) means for controlling said intranet server to remove said first resource from said local memory when a time out period has elapsed for said expiry value without receiving a request for said first resource.

3. The memory medium of claim 2, wherein said first resource is one of a plurality of resources, each of said plurality of resources having a separate usage count and expiry value.

4. The memory medium of claim 3, and further comprising:
    (a) means for controlling said intranet server to maintain a second resource in said local memory without regard for frequency of usage or elapsed time between requests for said second resource; and
    (b) means wherein said second resource is served, whenever received as new or revised from an upstream server or an intranet operator, to said downstream intranet server.

5. A memory medium for controlling an intranet server that handles the requests of one or more downstream intranet servers or users for resources that are served by one or more web servers via an internet to said intranet server, said memory medium comprising:
    (a) means for controlling said intranet server to maintain and update a usage count for each request from said users for a first resource;

(b) means for controlling said intranet server to obtain said first resource from one of said web servers that is capable of serving said first resource;
(c) means for controlling said intranet server to maintain said first resource in a local memory of said intranet server if said usage count is equal to or greater than a threshold count value;
(d) means for controlling said intranet server to periodically send an inquiry to said one web server, said inquiry identifying said first resource and a local version status of said first resource;
(e) means for controlling said intranet server to receive a response to said inquiry, said response including a current version status of said first resource and a current version of said first resource if said current version is more recent than said local version;
(f) means for controlling said intranet server to store said current version, when received, in said local memory; and
(g) means for controlling said intranet server to serve said current version of the first resource from said local memory to one of said downstream intranet servers or to one of said users in response to a request for said first resource.

6. The memory medium of claim 5, wherein said first resource is served when said one downstream intranet server or said one user requests said first resource without then requesting said one web server for an updated version.

7. The memory medium of claim 6, further comprising:
(a) means for controlling said intranet server to maintain an expiry value for said first resource and to reset said expiry value for each usage of said first resource;
(b) means for controlling said intranet server to remove said first resource from said local memory when a time out period has elapsed for said expiry value without receiving a request for said first resource.

8. The memory medium of claim 7, wherein said first resource is one of a plurality of resources, each of said plurality of resources having a separate usage count and expiry value.

9. The memory medium of claim 8, wherein said means for controlling said intranet server to maintain maintains a second resource in said local memory without regard for frequency of usage or elapsed time between requests for said second resource; and wherein said second resource is served to each of said downstream intranet servers that is arranged in said intranet to communicate directly with said intranet server.

10. The memory medium of claim 9, wherein said second resource is received from an intranet operator.

11. The memory medium of claim 10, wherein said means for controlling said intranet server to obtain requests said one web server to serve said first resource if said first resource is not stored in said local memory.

* * * * *